Dec. 12, 1950     C. O. SIPE     2,533,843
VEGETABLE SLICER
Filed April 27, 1948     2 Sheets-Sheet 1
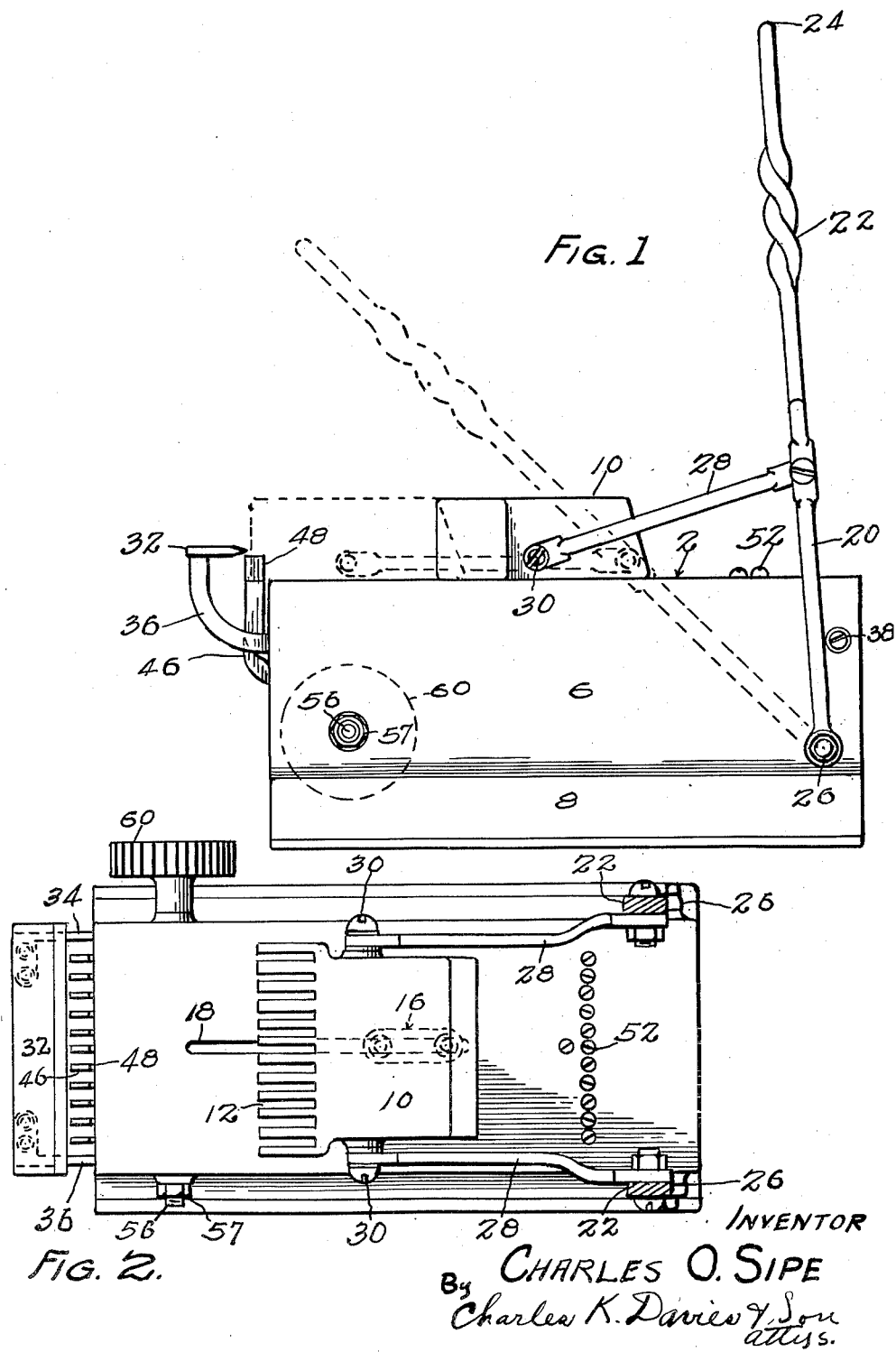
INVENTOR
CHARLES O. SIPE
By Charles K. Davies & Son
attys.

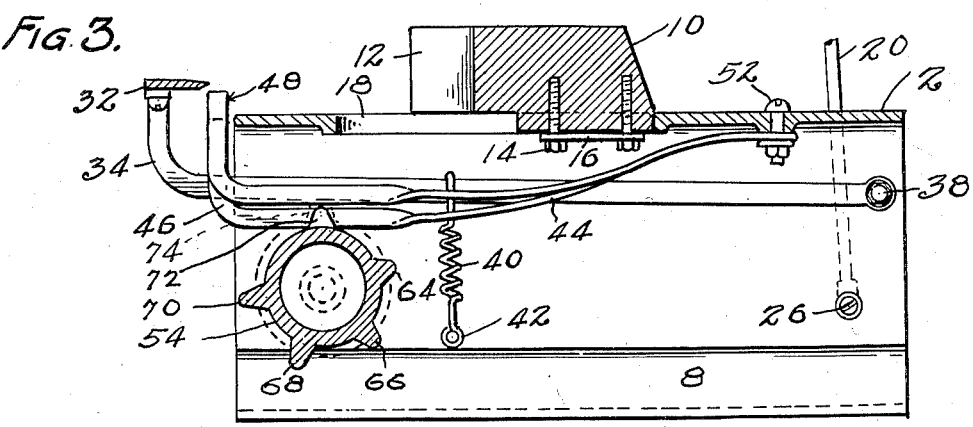
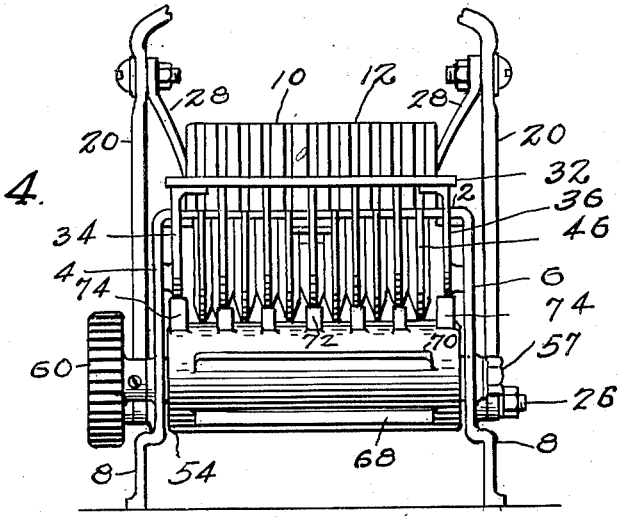
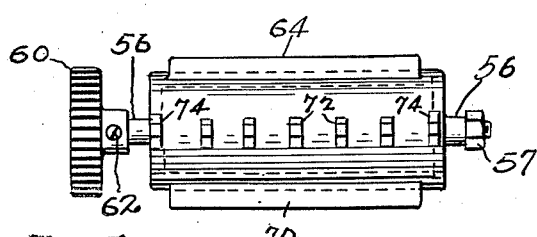
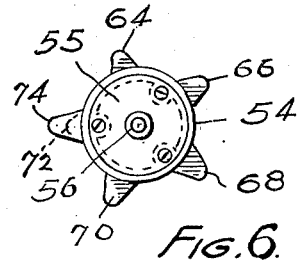

Patented Dec. 12, 1950

2,533,843

UNITED STATES PATENT OFFICE 2,533,843

VEGETABLE SLICER

Charles O. Sipe, Woody, Calif.

Application April 27, 1948, Serial No. 23,555

7 Claims. (Cl. 146—78)

My present invention relates to an improved vegetable slicer of the domestic type and comprising generally means for reciprocating across the supporting surface the vegetable to be sliced, and additional vertical slicing elements which may be regulated and adjusted according to the desire of the operator to cut the vegetable into slices, into strips, into cubes, and in various combinations for depth and thickness.

The slicer of my invention is simple in construction and operation and may be readily adaptable for use in kitchens to prepare for cooking such vegetables as potatoes for French frying, pan frying, cubing as for soups, and/or shoestring, and may be adjusted to produce these types of potatoes in slices or cubes of various sizes and thicknesses.

The adjustment mechanism is simple in operation and requires the operation of a single knob, and the other operating element consists in a pivoted actuating handle.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a side elevational view of the slicer of my invention.

Figure 2 is a top plan view thereof.

Figure 3 is a longitudinal vertical sectional view.

Figure 4 is an end elevational view.

Figure 5 is a plan view of the adjustment roller.

Figure 6 is an end elevational view thereof.

Referring now to the drawings wherein I have illustrated the present preferred embodiment of my invention, I employ a supporting plate 2 having depending side walls 4 and 6 which are formed with offset lower portions 8. The supporting frame may be made of suitable material such as metal and comprises a single piece of the material bent or otherwise formed into the desired shape.

Adapted to slide reciprocably along the top plate 2 I provide a block 10 of suitable material as wood and having a series of grooves or kerfs 12 in the forward end thereof, and the block is fashioned with screws 14 and washers 16 in the under side thereof for engagement with the slot 18 in the plate 2 to retain the block in reciprocating relation with the plate.

The block is manipulated reciprocably by means of the handle arms 20 of wire or other suitable material twisted at 22 for forming the handle 24, the ends of the handle arms are pivotally secured at 26 to the side walls 4 and 6 of the frame and connected by links 28 which are pivoted to the block at 30.

Forwardly of the plate 2 I locate a horizontally disposed knife 32 spaced from the end of the plate and this knife is carried by the arms 34 and 36 pivotally mounted on the rear portions of the side walls 4 and 6, at 38. Springs 40 secured to the arms, and secured at 42 to the side walls urge the arms and knife to the lowest position.

I also employ cutter bars 44 which are curved upwardly at their forward ends at 46 and which are fashioned into cutting edges 48 positioned to be elevated or lowered vertically between the horizontal knife and the front end of the plate. These cutter bars are of resilient material and are secured to the under side of the plate 2 by screws 52.

To vary the position of these cutter bars, I utilize a cylindrical roller 54 having end plates 56 for the shaft 56 and the nut 57 of the shaft secures the shaft and cylinder in suitable journals in the side walls 4 and 6.

A knob 60 secured by set screw 62 enables the operator to rotate the cylinder and to bring into selective position the ribs 64, 66, 68, and 70 extending longitudinally of the surface of the cylinder, and the series of aligned spaced lugs 72, the said series of lugs 72 and the rib 64 being circumferentially spaced sufficiently to enable the arms 34 and 36 to rest upon the cylinder rather than the ribs when in selected position. At the outer edges of the cylinder I provide a pair of lugs 74 which engage only the arms 34 and 36 to elevate the knife 32.

The lugs 72 are longitudinally spaced from each other so that alternate cutter bars are engaged by the lugs and thus one-half of the series of cutter bars extends above the top plate 2.

In operation the knob is rotated to set the knife and cutters at the desired position, it being apparent that the rotation of the knob and cylinder will bring into play the different height ribs and the lugs to adjust the position of the cutters and the knife, and the vegetable is then placed on the plate 2 in front of the block and the block reciprocated. As the vegetable is moved forwardly by the block it will be cut by the cutters or sliced by the knife depending upon the selected positions thereof, and if desired the vegetable may be rotated one-quarter turn and cut again to cube the cut portions.

The ribs 64 through 70 being of different height will of course raise the cutters to different heights above the plate and the spaced lugs will elevate alternate cutters. The lugs 74 will raise the arms 34 and 36 for the knife 32 and with these multiple positions, the cutters and knife may be employed to advantage to quickly and easily reduce a vegetable such as a potato to the desired strips, slices, or cubes for cooking.

The device of my invention may be manufactured inexpensively and will be readily salable at retail both to the housewife and to the commercial kitchen.

Having thus fully described my invention what I claim as new and desire to secure by Letters Patent is:

1. A vegetable slicer comprising a frame having a top plate, a feed block reciprocable on the plate and means for moving the block, a resiliently depressed knife blade horizontally positioned forwardly of and spaced from the plate, a series of resiliently depressed cutters vertically movable in the space between the knife and the plate, and manually operated means for selectively adjusting the knife and cutters above or below the plate to vary the cut of the vegetable as it is moved beyond the end of the plate.

2. A vegetable slicer comprising a frame having a top plate, a feed block reciprocable on the plate and means for moving the block, a spring-depressed knife blade horizontally positioned forwardly of and spaced from the plate, a series of resilient cutters vertically movable in the space between the knife and the plate, and means for selectively adjusting the knife and cutters above or below the plate to vary the cut of the vegetable as it is moved beyond the end of the plate.

3. A vegetable slicer comprising a frame having a top plate, a feed block reciprocable on the plate and means for moving the block, a spring-depressed knife blade horizontally positioned forwardly of and spaced from the plate, a series of resilient cutters vertically movable in the space between the knife and the plate, and means including a rotatable ribbed cylinder journaled in the frame, the ribs of which are selectively engageable with the cutters and knife to vary the position of the cutters and knife with relation to the plate.

4. A vegetable slicer comprising a frame having a top plate, a feed block reciprocable on the plate and means for moving the block, a spring-depressed knife blade horizontally positioned forwardly of and spaced from the plate, a series of resilient cutters vertically movable in the space between the knife and plate, a rotatable cylinder journaled in the frame and under the cutters and knife, longitudinally disposed ribs on the cylinder of varying height and engageable with the knife and cutters selectively upon rotation of the cylinder to vary the position of the knife and cutters with relation to the plate.

5. A vegetable slicer comprising a frame having a top plate, a feed block having a series of front grooves therein and reciprocable on the plate, and means for moving the block, a spring-depressed knife blade horizontally positioned forwardly of and spaced from the plate, a series of resilient cutters vertically movable in the space between the knife and the plate and aligned with the grooves of the block, a rotatable cylinder journaled in the frame and under the cutters and knife, longitudinally disposed ribs on the cylinder of varying height and engageable with the knife and cutters selectively upon rotation of the cylinder to vary the position of the knife and cutters with relation to the plate.

6. In a vegetable slicer including a supporting frame, the combination with a reciprocable and grooved feed block and its operating means, and a spaced horizontally disposed knife blade supported by and resiliently depressed within the frame, of a series of longitudinally extending and resilient cutter-bars supported by the frame beneath the feed block, upwardly projecting cutters rigid with said cutter-bars and located in the path of movement of the grooved feed block between the block and the knife blade, and means coacting with the cutter bars for vertically adjusting their cutters.

7. In a vegetable slicer, the combination with a frame, a pair of spring-depressed arms pivotally mounted in the frame, and a horizontally disposed knife blade carried by said arms, of a series of longitudinally extending and resilient cutter-bars supported by the frame and cutters on said bars vertically arranged adjacent the knife blade, means coacting with the arms and cutter bars for vertically adjusting the knife blade and cutters, and a manually operated grooved and reciprocable feed block coacting with said cutters and knife blade.

CHARLES O. SIPE.

REFERENCES CITED

The following references are of record in the file of this patent:

UNITED STATES PATENTS

| Number | Name | Date |
|---|---|---|
| 537,831 | Kraemer | Apr. 23, 1895 |
| 1,094,604 | Shibata | Apr. 28, 1914 |
| 1,479,469 | Kirnbauer | Jan. 1, 1924 |
| 2,055,749 | Miller | Sept. 29, 1936 |
| 2,088,383 | Miller | July 27, 1937 |
| 2,140,075 | Farabough | Dec. 13, 1938 |